(12) United States Patent
Grace

(10) Patent No.: US 8,146,413 B1
(45) Date of Patent: Apr. 3, 2012

(54) TWO-PORT TIRE VALVE STEM

(76) Inventor: Julian Grace, Abbotsford (CA)

(*) Notice: Subject to any disclaimer, the term of this patent is extended or adjusted under 35 U.S.C. 154(b) by 0 days.

(21) Appl. No.: 12/948,624

(22) Filed: Nov. 17, 2010

(51) Int. Cl.
*B60C 23/02* (2006.01)
(52) U.S. Cl. .................................. 73/146.8
(58) Field of Classification Search ............ None
See application file for complete search history.

(56) References Cited

U.S. PATENT DOCUMENTS

| | | |
|---|---|---|
| 1,176,907 A | 3/1916 | Kraft et al. |
| 1,297,239 A | 3/1919 | Potter |
| 3,276,417 A * | 10/1966 | Flowers ............... 116/34 R |
| 4,235,185 A * | 11/1980 | Byram ................. 116/34 R |
| 2002/0139288 A1 | 10/2002 | Evans et al. |
| 2003/0024463 A1 | 2/2003 | Evans et al. |
| 2008/0149244 A1 | 6/2008 | Liao |
| 2010/0180678 A1 * | 7/2010 | Casner ................ 73/146.8 |

* cited by examiner

*Primary Examiner* — Andre Allen
(74) *Attorney, Agent, or Firm* — John R. Flanagan

(57) ABSTRACT

A two-port tire valve stem has a body, preferably of substantially rigid construction, with a first end portion adapted to be mounted to a wheel rim and a second end portion with at least two ports in a branched configuration, each supporting a valve. One of the valve ports may be used for inflation or deflation concurrently with the other being coupled to a pressure sensor for monitoring the air pressure in the tire. The two-port tire valve stem is adapted to be rigidly mounted to an outer of a pair of adjacent wheels, using a bracket, while its first end is adapted to be connected in fluid communication with the inner of the pair of wheels.

20 Claims, 3 Drawing Sheets

TWO-PORT TIRE VALVE STEM

TECHNICAL FIELD

The present invention relates to a tire valve, and more particularly, the present invention relates to a two-port tire valve stem having an inflation valve port and a separate valve port onto which a pressure sensor may be mounted.

BACKGROUND OF THE INVENTION

A tire valve usually has a valve stem with a valve that extends through a stem hole in a wheel rim. The inner volume of the valve stem is in fluid communication with the hollow chamber enclosed by the tire. The valve in the stem permits air to be introduced into the tire and prevents escape of the air from the tire through the valve stem. The valve stem may be rubber or a rigid, metal stem, and is usually provided with a removable valve cap or dust cap on its threaded end. The cap is used to protect the inside of the valve.

Even though a rubber valve stem may be resilient, so that it may be sealed in the wheel rim opening as the stem is pulled into place, the rubber is exposed to various sharp objects with which it may come into contact while driving. Also, the rubber valve stem may become brittle or deteriorate due to exposure to the sun and contact with various salts, oils and other road-related substances.

A tire valve is very important for maintaining the correct air pressure in a tire. It is important for safety reasons but also for achieving optimal fuel efficiency and maximizing tire life. Under-inflated tires may result in rapid and excessive wear on the outer portions of the tread as well as improper vehicle handling. On the other hand, over-inflated tires may result in rapid and excessive wear on the middle part of the tread, and may possibly lead to a blowout.

Devices for checking or monitoring tire pressure have been available for many decades. The most common method for monitoring tire pressure is manual measurement using a tire gauge. This involves removing the valve cap and applying the tire gauge to the valve stem. Firstly, this method is complicated and requires an additional tool, which may be unavailable when needed and must be purchased at an additional cost to the operator. Secondly, the operation is time consuming for the operator as he must remove the valve cap for each tire, apply the pressure gauge, and then re-fasten all the valve caps. For recreational vehicles and trucks, or other vehicles with generally more wheels, this task can be onerous.

Another example of known tire pressure detection is the use of a tire pressure sensor installed on the inflation valve. However, when inflation or deflation of the tire is required, the tire pressure sensor has to be removed, which is still inconvenient and time consuming. Furthermore, it may be more time consuming because such pressure sensors are often fitted with a locking mechanism that needs to be undone and re-done. Such sensors, when detached while adjusting the tire pressure, may be lost in the same way that valves caps are often lost or forgotten. This is more of a problem due to the greater expense of the pressure sensors.

Other examples of prior art for tire pressure detection are disclosed in U.S. Pat. No. 1,176,907 and US Patent Application Publication No. 2008/0149244, both of which describe an adapter which is screwed onto the valve stem and which has two branches. On one branch, the pressure sensor is mounted, while the other branch may be used to relieve pressure or to pump air into the tire. However, as the disclosed valves and pressure detectors are not an integral part of the tire valve, the whole assembly becomes cumbersome and too weighty, affecting a wheel's balance. If the adapter and sensor are attached to a rubber valve stem, centripetal forces due to wheel rotation cause the rubber stem to deform while driving, which may lead to damage of the stem, deflation of the tire and a possible accident. A further problem with the use of an adaptor is that its use introduces at least one more joint through which air or contaminants may leak.

Accordingly, there is a need for a less cumbersome solution that permits the adjustment of air pressure without the need to remove a pressure sensor.

The foregoing examples of the prior art and the limitations related thereto are intended to be illustrative only and not exclusive. Other limitations of the prior art will become apparent upon reading the specification and study of the drawings.

SUMMARY OF THE INVENTION

Presented herein is a two-port valve stem of substantially rigid construction that, when fitted with valves and attached to a wheel rim, permits the adjustment of air pressure via one of the ports while a pressure sensor remains mounted on the other port.

In one aspect, the present invention is directed to a valve stem for fitting to a wheel rim which includes an elongated body of a hollow configuration and having first and second end portions. The first end portion is configured to mount to a wheel rim. The second end portion has first and second ports arranged in a branched configuration. Each of the first and second ports is configured to support an air pressure valve. The first end portion and the first port of the second end portion may be aligned with each other in an axial direction, and the second port may be arranged in a transverse relation to the first port and first end portion of the body. The body has one-piece substantially rigid construction with the first and second end portions integral parts of the body.

In another aspect, the present invention is directed to a tire valve extender assembly which includes a two-port valve stem, a flexible extended valve stem, and a mounting bracket. The two-port valve stem is formed by an elongated body of a hollow configuration having first and second end portions wherein one of the end portions has first and second ports arranged in a branched configuration with each of the ports being configured to support an air pressure valve. The flexible extended valve stem is coupled to the other of the end portions of the two-port valve stem body and has an end configured for attaching to a valve of an inner one of a pair of wheels. The mounting bracket is for fitting to a wheel rim of an outer one of the pair of wheels and configured for attaching to the two-port valve stem. The end of the flexible extended valve stem can be either substantially straight or bent.

In a further aspect, the present invention is directed to a tire valve assembly kit which includes a valve stem, a valve cap and a pressure sensor. The valve stem is formed by an elongated body of a hollow configuration having first and second end portions wherein one of the end portions has first and second ports arranged in a branched configuration with each of the ports being configured to support an air pressure valve, the other of the end portions being configured for mounting to a wheel rim. The valve cap is for fitting on one of the first and second ports. The pressure sensor is for fitting on the other of the first and second ports.

In addition to the exemplary aspects and embodiments described above, further aspects and embodiments will

DETAILED DESCRIPTION OF THE EMBODIMENTS OF THE INVENTION

The drawings and the following description depict specific embodiments to teach those skilled in the art how to make and use the best mode of the invention. However, those skilled in the art would appreciate that the features described below may be combined in various ways to form multiple variations of the invention.

Figure 1:
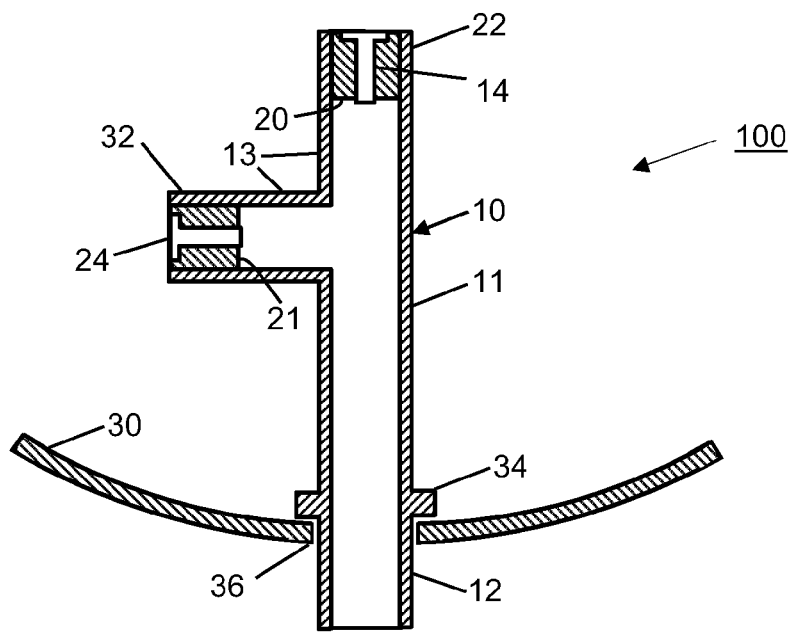
FIG. 1 is a schematic sectional view of an exemplary embodiment of the two-port valve assembly incorporating a two-port valve stem according to the present invention being shown in relation to a vehicle wheel rim.

Referring to FIG. 1, there is schematically illustrated a two-port tire valve assembly, generally designated 100, incorporating a two-port valve stem 10 according to an exemplary embodiment of the present invention. The two-port valve stem 10 has an elongated body 11 of hollow configuration. The hollow body 11 has a first end portion 12 and a second end portion 13. The first end portion 12 is configured to be secured within an aperture 36 of a wheel rim 30. The wheel rim 30 is used to support a vehicle tire (not shown). The second end portion 13 has a first port 22 and a second port 32 arranged in a branched configuration. The ports 22 and 32 are integral parts of the body 11 of the valve stem 10. The first port 22 is spaced apart from the second port 32. As shown in FIG. 1 the first port 22 and the first end portion 12 of the valve stem 10 are aligned with each other in an axial direction while the second port 32 is arranged transversely, for example in perpendicular relation, to the first port 22 and the first end portion 12 of the valve stem 10 thereby creating a T-shaped valve stem. In another embodiment, the valve stem and the two-ports may form a Y-shaped valve stem, and in yet other embodiments any other suitable shape of the valve stem or alignment of the parts may be used. For example, the first end portion 12, the first port 22 and the second port 32 may not all be aligned in the same plane. Angles between the first end portion 12, the first port 22 and the second port 32 may be acute, right or obtuse. The body 11 may be straight, curved or bent.

In one embodiment the valve stem 10 is a metal valve stem. The valve assembly 100 also includes a first valve 20 with an actuating pin 14 located within the first port 22 and a second valve 21 with an actuating pin 24 located within the second port 32. The pins 14 and 24 permit air to be introduced into the tire and prevent air from escaping from the tire through the valve stem 10 and ports 22 and 32, respectively. By pressing on either of the pins 14 and 24, air from the volume enclosed by the tire may be released from it. The valves 20 and 21 may be Schrader valves, which may be pre-assembled in ports 22 and 32 of the valve stem 10, or may be assembled within the ports 22 and 32 of the valve stem 10 by a user or service technician. Other types of valve may also be used. The valve stem 10, containing Schrader or other valves, may be provided as the assembly 100 to be fitted by the user or a service technician into a wheel rim, or the assembly 100 may be fitted to the wheel at its manufacturing stage.

The valve stem 10 may further have a flange 34 positioned in proximity of the first end portion 12 and extending radially outwards from the body 11 of the valve stem 10. The flange 34, in conjunction with one or more rubber washers (not shown) which would be applied about the first end portion 12 of the valve stem 10, seals and engages the valve stem 10 to the aperture 36 of the wheel rim 30, to prevent leakage of air from the tire around the outside of valve stem 10.

In another embodiment, the outside of the first end portion 12 of the valve stem 10 and optionally the inside surface of the aperture 36 may be threaded to help anchor the valve stem 10 to the wheel rim 30.

In another embodiment, instead of flange 34 a pair of spaced apart, resilient ribs (not shown) may extend radially outwardly from the first end portion 12 of the valve stem 10. The resilient ribs may be deformable so that they may be positioned within the aperture 36 of the wheel rim 30 to seal the valve stem 10 within the wheel rim 30, preventing leakage of air from the tire. Nuts or locknuts fitted on the first end portion 12 of the valve stem 10, on one or both sides of the aperture 36 may be used to seal and anchor the valve stem 10 to the wheel rim 30.

There are many permutations of flanges, threads, nut, ribs, seals and other components that may be used for sealing and anchoring the valve stem 10 to a wheel rim 30.

Figure 2:
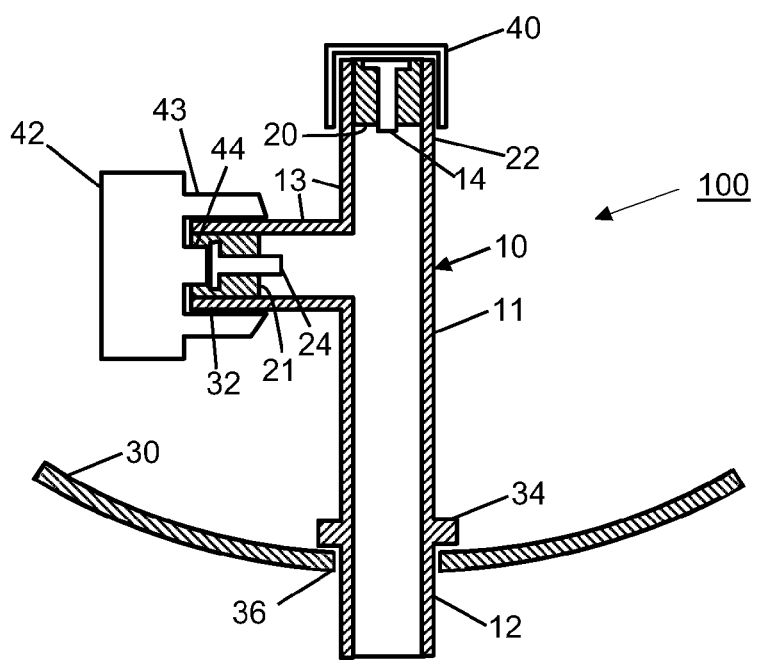
FIG. 2 is a schematic sectional view of the two-port valve assembly of FIG. 1 with a pressure sensor mounted on one of the valve ports.

Turning now to FIG. 2, there is illustrated the two-port tire valve assembly 100 with a tire pressure sensor 42 mounted on the second port 32. However, the pressure sensor 42 may be mounted on either port of the valve stem 10. The pressure sensor 42 has a housing 43, which is adapted to be screwed onto the open end of the second port 32. The pressure sensor 42 also has a penetration pad 44 disposed within the housing 43 and protruding outwardly such that the penetration pad 44 presses against the actuating pin valve 24, forcing it inwardly within the second port 32, as the housing 43 is screwed onto the second port 32 so that the interior of the pressure sensor 42 is placed in fluid communication with the interior of the hollow body 11 of the valve stem 10 and the tire, meaning that a portion of the air from the tire enters the pressure sensor 42. A metal or plastic valve cap 40 screws onto the open end of the first port 22 and protects the interior of the first valve 20, as well as the threaded end of port 22. In another embodiment, the cap 40 may be made of rubber.

As can be seen from FIG. 2, if the pressure sensor 42 is removed from the two-port valve stem 10, then the valve pin 24 of the second valve 21 will move outwards, preventing the escape of air from the tire. This feature is useful to facilitate the cleaning, maintenance, testing and battery changing of the pressure sensor 42 while removed from the wheel, and without necessitating a complete re-fill of air in the tire.

Figure 3:
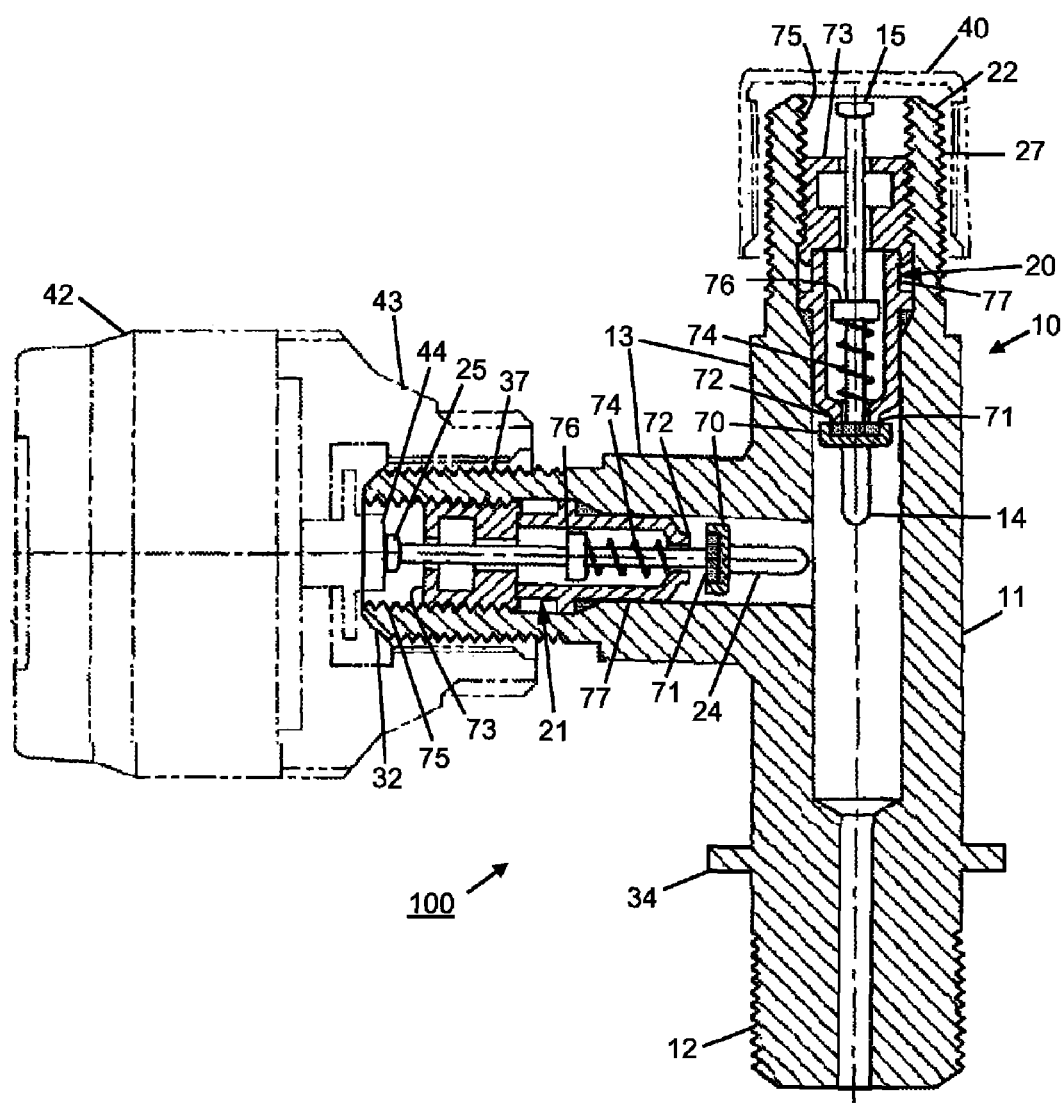
FIG. 3 is a cross-sectional detailed view of the two-port valve assembly of FIG. 1 showing interior parts and cooperation thereof.

Referring now to FIG. 3, there is shown in greater detail the interior parts of the valve assembly 100. The body 11 of the valve stem 10 with its first end portion 12 is adapted to be secured to the wheel rim by engaging flange 34. The first port 22 is positioned in an axial direction with respect to the first end portion 12, and the second port 32 is positioned transversely, for example perpendicularly, to the first port 22 and the first end portion 12. The cap 40, shown in dashed lines, is screwed over the open end of the first port 22, on external thread 27. The pressure sensor 42, shown in dashed lines, is screwed over the second port 32.

The interior of each of the ports 22 and 32 is hollow, with threaded internal walls 75, respectively. The actuating pin 14 and actuating pin 24 extend axially through the hollow tubes of ports 22 and 32, respectively, and are in communication with the hollow chamber enclosed by the valve stem 10 and the tire. A head 15 of valve pin 14 is flush, or close to flush, with the end of port 22.

The internal working parts of the two-port valve stem assembly 100 will be explained with respect to the components of the first valve 20 inserted in the first port 22. These are substantially the same as the components of the second valve 21 inserted in the second port 32.

The first valve 20 has a sleeve portion 77 held in place in the first port 22 by screw plug 73 of the first valve 20. The sleeve portion 77 mounts the actuating pin 14 such that the latter is axially located in the first port 22. The innermost, tail end of the sleeve portion 77 is tapered, forming an air inlet 72. The air inlet 72 and a flange 76, fixed to or part of the valve pin 14, retain a spring 74 therebetween and also located within the sleeve portion 77. The innermost, tail end of the valve pin 14 includes a compression pad 71 in cup 70 for opening and closing the air inlet 72.

In the operation of the first valve 20, the actuating pin 14 is held outwards, the head 15 flush or close to flush with the end of the port 22, by the spring 74, such that the air inlet 72 of the first port 22 is closed by the compression pad 71. Air pressure within the tire, if greater than the exterior pressure, will also help to keep the air inlet 72 closed. As a result, escape of air from the tire through the first port 22 is in normal use prevented.

When inflation of air via the first port 22 is required, the actuating pin 14 of the first valve 20 is pushed inwards, with a pump (not shown), such that the compression pad 71 is pushed away from the air inlet 72, allowing higher pressure air to enter through the air inlet 72 into the main interior of the valve stem 10 and into the tire. After inflation is completed, the pump is removed, the actuating pin 14 is returned by spring 74 to the closed position, where the compression pad 71 is held onto air inlet 72. The valve cap 40 may then screwed onto the first port 22.

Referring now to the second port 32 of the two-port valve assembly 100, it is readily understood that the pressure sensor 42 is secured over the second port 32, on external thread 37, so that it is not necessary to remove the pressure sensor 42 when the tire is inflated, which is very practical and convenient for the user. The head 25 of actuating pin 24 of the second valve 21 would be flush, or near flush, with the end of the second port 32 if there were no pressure sensor 42 mounted on the second port 32. However, when the pressure sensor 42 in mounted over the second port 32, the penetration pad 44 forming part of the pressure sensor 42 pushes against the head 25 of the actuating pin 24 of the second valve 21. With the actuating pin 24 of the second valve 21 in this position, the air pressure within the tire may flow from the tire and valve stem interior, through the second port 32 and into the pressure sensor 42. The air does not escape from the first port 22 since the air inlet 72 in first port 22 is closed. While mounted, the pressure sensor 42 detects the tire pressure. In the case of abnormal tire pressure, a corresponding signal, such as a visual or audible signal, alerts the user. In one embodiment, the alert signal may be an electronic signal that is wirelessly transmitted to the dashboard of the vehicle, to thereby alert the user with a visual or audible signal. Many known types of pressure sensors may be used with the present invention. Combination pressure and temperature sensors may also be used.

The body 11 of the valve stem 10 may be made from steel, stainless steel, aluminum, aluminum alloy or the like such that the body 11 has a substantially rigid construction. As an example, the valve stem body 11 may be made from two bars that are machined appropriately and then welded together. Alternatively, it may be cast and then machined. It is also conceivable that the valve stem body 11 may be made from plastic or fibre-glass reinforced plastic. It may be chrome plated or anodized, for example. In general, the body 11 of the valve stem 10 may be a one-piece component, either made from a single contiguous piece of material, or by permanently joining two pieces of similar material. Other possible materials include copper, brass and other non-ferrous or ferrous alloys. Also, a molded hard rubber material may be used of a hardness that will render the valve stem body 11 with a substantially rigid construction as if it were made from a metal.

The two-port valve assembly 100 incorporating the valve stem 10 with the body 11 of substantially rigid construction in accordance with the present invention may be mounted on the vehicle rim 30 during manufacture or it may be sold as a retro-fit kit to be easily installed on any standard wheel by anyone who is able to fit a conventional single port valve stem. The kit may include the rigid valve stem body 11 having the first end portion 12 that is adapted to be sealed and mounted to the wheel rim 30. The valve stem body 11 has the branched second end portion 13 with first and second ports 22, 32 which are integral parts of the valve stem body 11 and together form the T-shaped rigid valve stem 10. The rigid valve stem 10 with two ports 22, 32 may have any other suitable shape, such as for example a Y-shape. Each end portion 12, 13 of the valve stem 10 has a threaded external wall for attaching the valve cap 40 or pressure sensor 42. The kit may further include at least two valves 20, 21, one or two valve caps 40 (metal or plastic) and the pressure sensor 42 adapted to be mounted on one of the ports 22, 32. The valves 20, 21 may be Schrader valves that are pre-assembled within the first and second ports 22, 32. The kit may be sold as a retro-fit kit for a single wheel. Optionally, the number of constituent parts in the kit may be multiplied by an integral number and sold as a kit for four tires, eight tires etc. Spare parts may also be included in the kit, such as a spare valve cap 40 or a spare pressure sensor 42.

Figure 4:
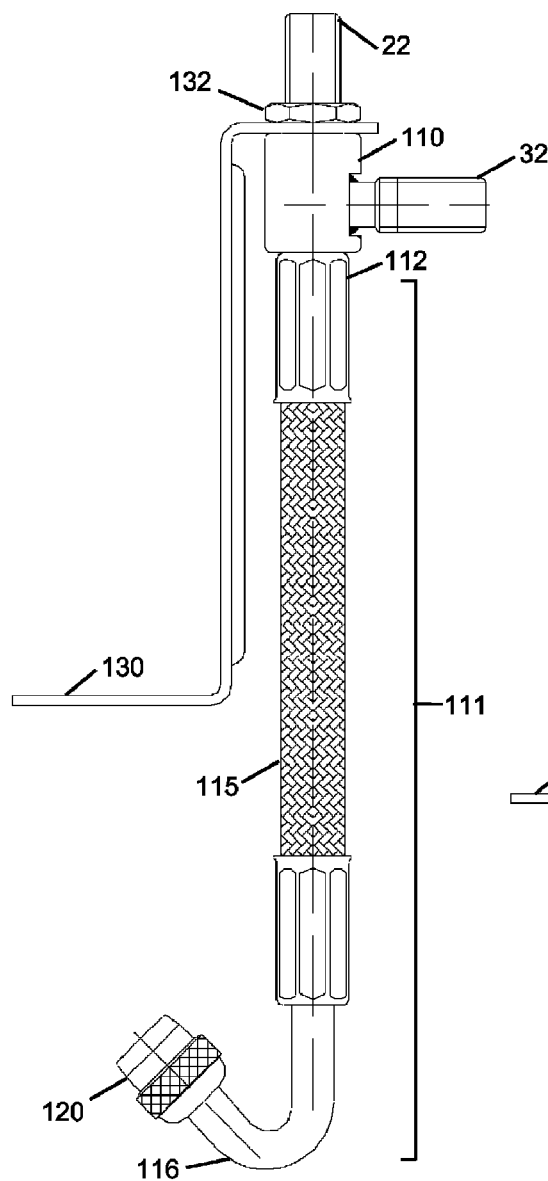
FIG. 4 is a side elevational view of the two-part valve stem of the present invention attached to a bent tire valve extender.
Figure 5:
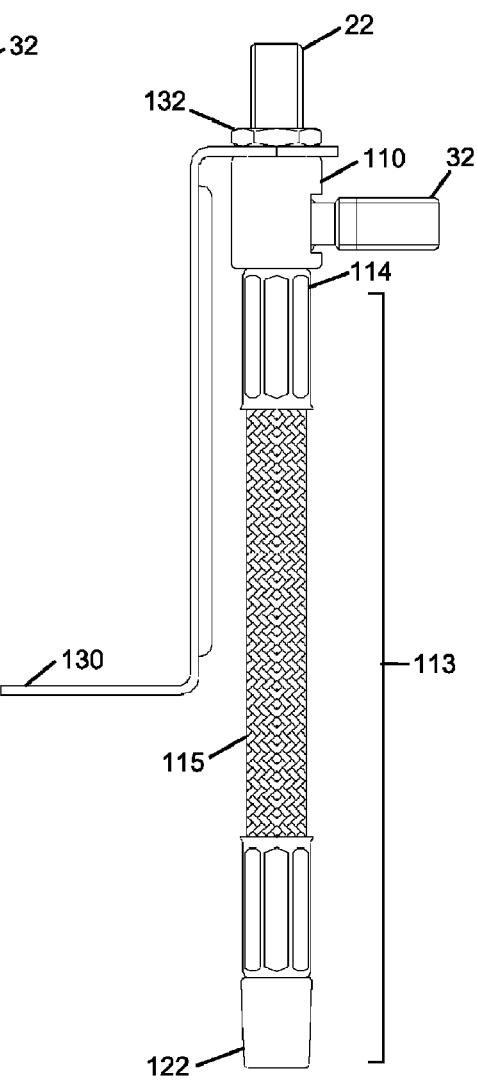
FIG. 5 is a side elevational view of the two-part valve stem of the present invention attached to a straight tire valve extender.

Referring to FIGS. 4 and 5, a two-port tire valve stem 110 may be mounted rigidly onto a tire valve extender. Tire valve extenders are typically used when there are two wheels mounted on each end of an axle. Since the inner wheels are difficult to access for adjusting tire pressure, valve extenders are often fitted to the inner wheel valves, and pass through a hole in the outer wheel. The inner wheel may have their valves facing inwards or outwards.

Referring to FIG. 4, a two-port valve stem 110 is shown attached to bent tire valve extender 111, which in turn is configured to attach to the inner of a pair of wheels where the inner wheel valve faces inwards, i.e. towards the center of the axle. The tire valve extender has an elongated flexible portion 115 and is attached or permanently attached at end 112 to the two-port valve stem 110. The bent end 116 of the tire valve extender terminates with an adapter 120 for screwing onto the valve of the valve of the inner tire. The two-port valve stem 110 is configured to accept the mounting of a rigid bracket 130, held in place by nut 132. The bracket 130 allows the two-port valve stem to be rigidly fastened to the out of a pair of wheels. For example, the bracket may be attached to a chrome wheel disc, a wheel hub or a wheel nut. By rigidly mounting the two-port valve stem 110, it is prevented from flapping around as the wheel rotate. The body of two-port valve stem 110 may have a hexagonal or square cross section for facilitating the tightening of the nut 132. There are many types of bracket that may be used to obtain the desired result of rigidly mounting the two-port valve stem 110 to an outer of a pair of wheels, while at the same time connecting to the valve of the inner wheel.

Referring to FIG. 5, a two-port valve stem 110 is shown attached to a straight tire valve extender 113, which in turn is configured to attach to the inner of a pair of wheels where the inner wheel valve faces outwards, i.e. away from the center of the axle. The tire valve extender has an elongated flexible portion 115 and is attached or permanently attached at end 114 to the two-port valve stem 110. The other end of the straight tire valve extender 113 attaches via adapter 122 to the valve of the inner tire. As above, a mounting bracket 130 may be attached to the two-port valve stem 110 using nut 132.

In some embodiments, inner wheels may be provided with flexible, extended valve stems. In this case, the two-port valve stem may be configured to attach to the inner valve stem without the need for a tire valve extender, while still being mounted on the outer wheel using a bracket.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tire valve stem for fitting to a wheel rim, comprising:
   an elongated body of a hollow configuration and having first and second end portions;
   wherein said first end portion is configured for mounting to a wheel rim;
   wherein said second end portion has first and second ports arranged in a branched configuration; and
   wherein each of said first and second ports is configured for supporting an air pressure valve.

2. The stem of claim 1 wherein said body has a substantially rigid construction.

3. The stem of claim 1 further comprising an air pressure valve supported by each of said first and second ports.

4. The stem of claim 3 wherein said air pressure valve is a Schrader valve.

5. The stem of claim 1 wherein said branched configuration of said first and second ports is substantially T-shaped.

6. The stem of claim 1 wherein said second port is arranged in a transverse relation to said first port and said first end portion of said body.

7. The stem of claim 1 wherein said first end portion and said first port of said second end portion are aligned with each other in an axial direction.

8. The stem of claim 7 wherein said second port is arranged in a transverse relation to said first port and said first end portion of said body.

9. The stem of claim 1 wherein said body is of one-piece construction with said first and second end portions integral parts of said body.

10. The stem of claim 1 wherein said first end portion of said body includes a flange extending radially outwards from said body adapting said first end portion to mount through an aperture in a wheel rim.

11. The stem of claim 1 wherein said body is made of either a metal, plastic, fibre-glass reinforced plastic or rubber.

12. A tire valve extender assembly, comprising:
    a two-port valve stem formed by an elongated body of a hollow configuration having first and second end portions, one of said end portions having first and second ports arranged in a branched configuration wherein each of said ports is configured to support an air pressure valve;
    a flexible extended valve stem coupled to the other of said end portions of said two-port valve stem body and having an end configured for attaching to a valve of an inner one of a pair of wheels; and
    a mounting bracket for fitting to a wheel rim of an outer one of the pair of wheels and configured for attaching to said two-port valve stem.

13. The assembly of claim 12 wherein said end of said flexible extended valve stem has a substantially straight configuration.

14. The assembly of claim 12 wherein said end of said flexible extended valve stem has a substantially bent configuration.

15. The assembly of claim 12 further comprising an air pressure valve supported by each of said first and second ports.

16. The assembly of claim 12 wherein said body of said two-port valve stem has a substantially rigid construction.

17. A tire valve assembly kit, comprising:
    a valve stem formed by an elongated body of a hollow configuration having first and second end portions, one of said end portions having first and second ports arranged in a branched configuration wherein each of said ports is configured to support an air pressure valve, the other of said end portions being configured for mounting to a wheel rim;
    a valve cap for fitting on one of said first and second ports; and
    a pressure sensor for fitting on the other of said first and second ports.

18. The kit of claim 17 further comprising an air pressure valve for assembling with said first and second ports.

19. The kit of claim 17 further comprising an air pressure valve mounted in each of said first and second ports.

20. The kit of claim 17 wherein said body of said two-port valve stem has a substantially rigid construction.

* * * * *